United States Patent
Daute

(10) Patent No.: US 8,796,355 B2
(45) Date of Patent: Aug. 5, 2014

(54) THERMOPLASTIC COMPOSITION CONTAINING A MOLD RELEASE AGENT WHICH IS BASED ON AN ESTER OF DI- OR POLYGLYCEROLS AND AT LEAST ONE CARBOXYLIC ACID

(75) Inventor: Peter Daute, Beverstedt (DE)

(73) Assignee: Emery Oleochemicals GmbH, Dusseldorf (DE)

( * ) Notice: Subject to any disclaimer, the term of this patent is extended or adjusted under 35 U.S.C. 154(b) by 521 days.

(21) Appl. No.: 12/677,882

(22) PCT Filed: Sep. 12, 2008

(86) PCT No.: PCT/EP2008/062198
§ 371 (c)(1),
(2), (4) Date: Jun. 28, 2010

(87) PCT Pub. No.: WO2009/037210
PCT Pub. Date: Mar. 26, 2009

(65) Prior Publication Data
US 2010/0267860 A1    Oct. 21, 2010

(30) Foreign Application Priority Data

Sep. 13, 2007 (DE) .......... 10 2007 043 753

(51) Int. Cl.
*C08K 5/10* (2006.01)
*C08K 5/103* (2006.01)

(52) U.S. Cl.
USPC ............ 523/124; 524/306; 524/308; 524/310

(58) Field of Classification Search
USPC ........................... 523/124; 524/306, 308, 310
See application file for complete search history.

(56) References Cited

U.S. PATENT DOCUMENTS

| | | | |
|---|---|---|---|
| 4,962,145 A | 10/1990 | Worschech et al. | |
| 7,071,343 B2 | 7/2006 | Daute et al. | |
| 7,446,141 B2 | 11/2008 | Bos et al. | |
| 7,488,838 B2 | 2/2009 | Daute et al. | |
| 2005/0234171 A1 | 10/2005 | Bos et al. | |
| 2007/0298986 A1 | 12/2007 | Daute | |
| 2008/0051303 A1 | 2/2008 | Brand et al. | |
| 2010/0168255 A1 | 7/2010 | Westfechtel et al. | |

FOREIGN PATENT DOCUMENTS

| | | |
|---|---|---|
| DE | 3643968 A1 | 6/1988 |
| DE | 102004009895 B3 | 7/2005 |
| EP | 0758641 A1 | 2/1997 |
| EP | 1544233 A1 | 6/2005 |
| EP | 1605017 A1 | 12/2005 |
| JP | 04334449 A | 11/1992 |
| JP | 2006124451 A | 5/2006 |

OTHER PUBLICATIONS

Daute et al., U.S. Appl. No. 12/743,878, filed May 20, 2010.
Daute, U.S. Appl. No. 12/677,849, filed Mar. 12, 2010.
German language International Preliminary Report on Patentability mailed on Dec. 15, 2009 in PCT/EP2008/062198.
German language Written Opinion mailed on Dec. 15, 2009 in PCT/EP2008/062198.
International Search Report mailed on Mar. 11, 2009 in PCT/EP2008/062198.
Vonder et al., U.S. Appl. No. 12/743,850, filed May 20, 2010.

*Primary Examiner* — Kriellion Sanders
(74) *Attorney, Agent, or Firm* — Smith Moore Leatherwood LLP; Philp P. McCann; John P. Zimmer

(57) ABSTRACT

The present invention relates to a thermoplastic composition containing a thermoplastic polymer, a mold release agent, and optionally further additives, wherein the mold release agent contains an ester of at least one alcohol component based on two or more glycerol units, and at least one carboxylic acid or a derivative of a carboxylic acid or both. The present invention also relates to a method for producing a thermoplastic composition, to the thermoplastic composition obtainable by this method, to a method for producing a molded article based on a thermoplastic composition, to a molded article obtainable by this method and also to the use of a mold release agent.

23 Claims, No Drawings

THERMOPLASTIC COMPOSITION CONTAINING A MOLD RELEASE AGENT WHICH IS BASED ON AN ESTER OF DI- OR POLYGLYCEROLS AND AT LEAST ONE CARBOXYLIC ACID

This application is a national stage application under 35 U.S.C. 371 of International Application No. PCT/EP2008/062198 filed 12 Sep. 2008, and claims priority to German Application No. 10 2007 043 753.8 filed 13 Sep. 2007, the disclosures of which are expressly incorporated herein by reference.

BACKGROUND

The present invention relates to a thermoplastic composition, to a method for producing a thermoplastic composition, to the thermoplastic composition obtainable by this method, to a method for producing a molded article based on a thermoplastic composition, to a molded article obtainable by this method and also to the use of a mold release agent containing an ester of di- or polyglycerols and at least one carboxylic acid.

Thermoplastic compositions based on thermoplastic polymers are frequently used, on account of their thermoplastic properties, to produce molded articles. This involves heating the thermoplastic compositions to a temperature above the glass transition temperature of the thermoplastic polymers and subsequently injecting them, for example by means of injection molding, into an injection mold which gives the composition its desired shape.

However, effective mold release behavior is a key property for a thermoplastic composition in order to allow efficient and economical processing to form molded articles, for example by means of injection molding. Normally, a mold release agent has to be added to a thermoplastic composition used for producing molded articles in order to allow this processing behavior. In order to effectively function as a mold release agent, an agent of this type or a compound of this type must be stable under the processing conditions, so that it does not lose its effectiveness and/or cause discoloration. Furthermore, if possible, the mold release agent may chemically interact with the polymers and other components of the composition or otherwise adversely affect the composition only to the extent that the properties of the thermoplastic composition are not adversely affected or, if such an effect is inevitable, are affected only slightly. In transparent or translucent polymers, the mold release agent should not impair the transparency. During the injection molding, the mold release agent should not form any deposits on the surface of the mold, nor should it migrate, after molding, into the surface of the part to the extent that it becomes visible on the surface. Such deposition of a mold release agent on the surface of a molded article is referred to as a "tarnish".

US 2005/0234171 A1 describes a thermoplastic composition which is based on aromatic polycarbonates or mixtures of aromatic polycarbonates and polyesters and contains a mixture of a fatty acid ester of a polyol having 2 to 6 hydroxyl groups and a $C_{10}$-$C_{36}$ carboxylic acid and a saturated α-olefin oligomer as a mold release agent. However, the drawback of this thermoplastic composition consists inter alia in the fact that the mold release agent, which is contained therein and consists of two chemically different components (fatty acid ester and α-olefin oligomer) is very complex in its chemical composition. In addition, the transparency of the thermoplastic composition described in US 2005/0234171 A1 is capable of further improvement.

Furthermore, the mold release agents used in the prior art, in particular in US 2005/0234171 A1, display high volatility, causing a part of the mold release agent to escape on account of the high temperatures during the production of molded articles. Not only is this alarming for toxicological reasons; it also leads to an impairment of the detaching behavior of the thermoplastic compositions from the surfaces of an injection mold.

SUMMARY

The present invention includes various embodiments as set forth herein.

The present invention was based on the object of overcoming at least some of the drawbacks resulting from the art in relation to thermoplastic molding compounds.

An object according to the invention was to provide a mold release agent which, apart from being able to be produced cost-effectively and displaying good mold release properties, is distinguished by good environmental compatibility and is suitable, in particular as a result of its good biodegradability, for use as a mold release agent in the production of fibers, foils, films and molded articles from biodegradable thermoplastic compositions.

In particular, the present invention was based on the object of disclosing thermoplastic compositions, but in particular thermoplastic compositions based mainly or exclusively on thermoplastic polyesters, which, when they are used to produce molded articles, for example by means of injection molding, can easily be detached from the surface of the injection mold, wherein the thermoplastic composition contains as few chemically different constituents as possible and can therefore also be produced cost-effectively in as few method steps as possible.

In addition, the present invention was based on the object of disclosing a thermoplastic composition displaying improved transparency compared to the thermoplastic compositions known in the art and also improved detaching behavior from the surface of an injection mold compared to the thermoplastic compositions known in the art. In particular, as few components of this composition as possible, and if possible even none of the components, should escape in the processing of the thermoplastic composition, in particular in the production of molded articles from this thermoplastic composition, thus allowing the toxicological exposure of the persons involved in producing molded articles to be reduced to a minimum.

The present invention was also based on the object of disclosing a method which can be used to produce the advantageous thermoplastic composition described hereinbefore.

Furthermore, the present invention was based on the object of disclosing a method for producing a molded article, in which a thermoplastic composition is transferred, after heating to a temperature in the range of or above the glass transition temperature of the thermoplastic composition, to a molded article, wherein the molded article, once cooled, may be detached from the surfaces of the mold used to produce the molded article even more effectively than the molded articles known in the art, in particular than the prior-art molded articles based on thermoplastic polyesters.

DETAILED DESCRIPTION

The present invention was also based on the object of disclosing a molded article, in particular a molded article based on a thermoplastic polyester, which can be produced cost-effectively compared to the thermoplastic polyester-based molded articles known in the art and if possible also displays improved transparency.

A contribution to achieving at least one of the objects mentioned at the outset is made by a thermoplastic composition containing a) a thermoplastic polymer,
b) a mold release agent, and
c) optionally further additives, wherein the mold release agent contains an ester of
at least one alcohol component based on two or more glycerol units; and
at least one carboxylic acid or a derivative of a carboxylic acid or both.

The alcohol component is preferably in the form of branched, unbranched or else cyclic alcohol compounds based in each case on two or more, preferably 2 to 20 and particularly preferably 2 to 10 glycerol units. The alcohol component may also be in the form of mixtures of 2 or 3 or more of the alcohol compounds mentioned hereinbefore. In this case, it is preferable for the proportion of alcohol compounds consisting of 5 and fewer glycerol units to be at least 50% by weight, preferably at least 70% by weight and particularly preferably at least 80% by weight, based in each case on the alcohol component. Furthermore, in another configuration according to the invention, it is preferable for the proportion of alcohol compounds having 6 and more glycerol units to be less than 50% by weight, preferably less than 30% by weight and particularly preferably less than 20% by weight, based in each case on the alcohol component.

In a further configuration of the thermoplastic composition according to the invention, the alcohol component corresponds to structure I or structure II or a mixture of the two, wherein structure I

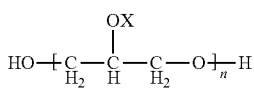

structure II

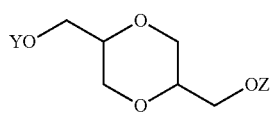

radical A

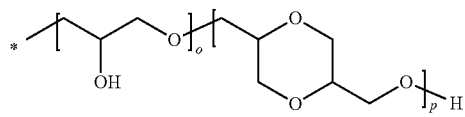

with
n as an integer from the range of from 2 to 100, particularly preferably from 2 to 50, additionally preferably from 2 to 25, even more preferably from two to 10, additionally preferably from 2 to 5 and additionally even more preferably from 2 to 4;
o as an integer from the range of from 0 to 70, particularly preferably from 1 to 50, additionally preferably from 1 to 25, even more preferably from two to 10, additionally preferably from 1 to 5 and additionally even more preferably from 1 to 4;
p as an integer from the range of from 0 to 70, particularly preferably from 1 to 50, additionally preferably from 1 to 25, even more preferably from two to 10, additionally preferably from 1 to 5 and additionally even more preferably from 1 to 4;
* as the linking of radical A;
X as hydrogen or radical A;
Y as hydrogen or radical A; and
Z as hydrogen or radical A.

In one configuration according to the invention, more than 50% by weight, preferably more than 75% by weight and particularly preferably more than 85% by weight of one or more compounds of structure I are contained in an alcohol component. In another configuration according to the invention, more than 50% by weight, preferably more than 75% by weight and particularly preferably more than 85% by weight of one or more compounds of structure II are contained in an alcohol component. The foregoing percentages by weight are based in each case on the alcohol component.

The term "thermoplastic polymer", such as it is used in the present document, refers to plastics materials which are easily (thermoplastically) deformable in a specific temperature range. This process is reversible and can be repeated as many times as desired by cooling and reheating into the melted state, provided that overheating does not cause decomposition of the material by heat.

Thermoplastic polymers which can be contained in the composition according to the invention are in particular thermoplastic polyurethanes, thermoplastic polyesters, thermoplastic polyamides, thermoplastic polyolefins, thermoplastic polyvinyl esters, thermoplastic polyethers, thermoplastic polystyrenes, thermoplastic polyimides, thermoplastic sulphur polymers, thermoplastic polyacetals, thermoplastic fluoroplastics, thermoplastic styrene-olefin copolymers, thermoplastic polyacrylates, thermoplastic ethylene-vinyl acetate copolymers or mixtures of two or more of the thermoplastic polymers mentioned hereinbefore.

However, according to the invention, it is preferable for more than 90% by weight, particularly preferably more than 95% by weight, additionally even more preferably at least 99% by weight and most preferably 100% by weight of the thermoplastic polymer, based in each case on the total weight of the thermoplastic polymer, to be based on thermoplastic polyesters. The term "polyester", as used in the present document, includes in particular polymers which were obtained by a polycondensation reaction between a polycarboxylic acid and a polyol (what are known as "AA//BB-polyesters") or by a polycondensation reaction of a hydroxycarboxylic acid or by ring-opening polymerization of a cyclic ester (what are known as "AB-polyesters"). In one configuration according to the invention, polycarbonates, which can be obtained by reacting phosgene with diols, can be excluded from the term "polyester" used in accordance with the invention.

In principle, all currently known thermoplastic polyesters and copolyesters can be used as component a) in the thermoplastic composition according to the invention. Examples of polyesters of this type include substantially linear polyesters which were produced via a condensation reaction of at least one polycarboxylic acid, preferably a dicarboxylic acid (dibasic acid) or an ester-forming derivative thereof and at least one polyol, preferably a dihydric alcohol (diol). The preferably dibasic acid and the preferably dihydric diol can both be either aliphatic or aromatic, although aromatic and partially aromatic polyesters are particularly preferred as thermoplastic molding materials with regard to their high softening points and hydrolytic stability. In aromatic polyesters, substantially all the ester links are attached to the aromatic rings. They may be semicrystalline and even display liquid crystalline behavior or be amorphous. According to the invention, partially aromatic polyesters which were obtained from at least one aromatic dicarboxylic acid or an ester-forming derivative thereof and at least one aliphatic diol are particularly preferably thermoplastic polyesters. Examples of suitable aromatic dicarboxylic acids include terephthalic acid, 1,4-naphthalene dicarboxylic acid or 4,4'-biphenyl dicarboxylic acid. Examples of suitable aliphatic diols include alkylene diols, especially those containing 2 to 6 C atoms, preferably 2 to 4 C atoms, particular examples being ethylene glycol, propylene diols and butylene diols. Preferably, ethylene glycol, 1,3-propylene diol or 1,4-butylene diol is used as the polyol or diol component to produce the thermoplastic polyesters contained in the composition according to the invention as component a). Thermoplastic polyesters which are particularly preferred in accordance with the invention and are obtainable by reacting a dicarboxylic acid with a diol include in particular polyalkylene terephthalates, for example polyethylene terephthalate (PET), polypropylene terephthalate (PPT) or polybutylene terephthalate (PBT), polyalkylene naphthalates, for example polyethylene naphthalate (PEN) or polybutylene naphthalate (PBN), polyalkylene dibenzoates, for example polyethylene bibenzoate, and also mixtures of at least two of these thermoplastic polyesters.

These partially aromatic polyesters described hereinbefore can optionally contain a small quantity of units originating from other dicarboxylic acids, for example isophthalic acid, or other diols such as cyclohexane dimethanol; this generally reduces the melting point of the polyester. A special group of partially aromatic polyesters are what are known as segmented or block copolyesters which contain what are known as "soft segments" in addition to the polyester segments mentioned hereinbefore (also known as "hard segments"). These soft segments originate from a flexible polymer; that is to say a substantially amorphous polymer having a low glass transition temperature ($T_g$) and low rigidity, with reactive end groups, preferably two hydroxyl groups. Preferably, the glass transition temperature of these "soft segments" is less than 0° C., particularly preferably less than −20° C. and most preferably less than −40° C. In principle, a plurality of different polymers can be used as the soft segment. Suitable examples of "soft segments" are aliphatic polyethers, aliphatic polyesters or aliphatic polycarbonates. The molar mass of the soft segments can vary greatly, but is preferably between 400 and 6,000 g/mol.

In addition to the linear polyesters mentioned hereinbefore, which are obtainable via a polycondensation reaction of at least one polycarboxylic acid or an ester-forming derivative thereof and at least one polyol, the thermoplastic composition according to the invention can also contain thermoplastic polyesters which are obtainable by a polycondensation reaction of short-chain hydroxycarboxylic acids or by a ring-opening reaction of cyclic esters.

Examples of suitable, short-chain hydroxycarboxylic acids which can be used for producing thermoplastic polymers include in particular L-lactic acid, D-lactic acid, DL-lactic acid, glycolic acid, 3-hydroxybutyric acid, 4-hydroxybutyric acid, 4-hydroxyvaleric acid, 5-hydroxyvaleric acid, 6-hydroxycaproic acid and also mixtures of these hydroxycarboxylic acids. Examples of suitable cyclic esters include in particular glycolide (a dimer of glycolic acid) and ε-caprolactone (a cyclic ester of 6-hydroxycaproic acid).

The production of the thermoplastic polyesters described hereinbefore is described inter alia also in "*Encyclopedia of Polymer Science and Engineering*", Volume 12, pages 1 to 75 and pages 217 to 256; John Wiley & Sons (1988) and also in "*Ullmann's Encyclopedia of Industrial Chemistry*", Volume A21, pages 227 to 251, VCH Publishers Inc. (1992). Thermoplastic polymers preferred in accordance with the invention are polyethylene terephthalate (PET), polybutylene terephthalate (PBT) and polylactic acid (PLA), wherein more than 50% by weight, preferably more than 75% by weight and particularly preferably more than 90% by weight of each of these polymers, based in each case on the thermoplastic composition, can be contained per se in a preferred configuration of a thermoplastic composition of the present invention.

In addition to the thermoplastic polymer as component a), the composition according to the invention also comprises as component b) a mold release agent preferably containing an ester of the alcohol component of structure I or structure II or a mixture of compounds of structure I and II and a carboxylic acid. The wording "ester of the alcohol component of structure I or II and a carboxylic acid", such as it is used in the present document, therefore merely expresses the fact that the ester may be described in terms of its chemical composition as an ester of an alcohol component of structure I or II and a carboxylic acid. However, in principle, the ester can be produced and obtained, not only by reacting the carboxylic acid with the alcohol component of structure I or II, but also by reacting the carboxylic acid with glycidol.

The term "carboxylic acid", such is it is used in the present document, includes carboxylic acid in its protonated form, carboxylic acid in its deprotonated form (i.e. in particular salts of carboxylic acid) as well as mixtures of carboxylic acid in its protonated form and its deprotonated form. Furthermore, in principle, the term "carboxylic acid" includes all compounds having at least one carboxylic acid group. It therefore includes in particular also compounds comprising, in addition to the at least one carboxylic acid group, also other functional groups, such as for example hydroxyl groups, keto groups or ether groups. Dicarboxylic acids, tricarboxylic acids or carboxylic acids having more than three carboxyl groups are also included by the term "carboxylic acids", although monocarboxylic acids are particularly preferred.

The term "derivative of a carboxylic acid" includes all derivatives of a carboxylic acid leading in a reaction with an alcohol to a corresponding ester of the carboxylic acid. In particular, the term "derivative of a carboxylic acid" includes the acid chlorides of the carboxylic acid and also the acid anhydrides of the carboxylic acid. These derivatives preferably display increased reactivity of the carboxylic acid group compared to the carboxylic acid, so that the formation of esters is promoted in a reaction with an alcohol.

Mold release agents containing esters of an alcohol component of structure I and a carboxylic acid or a derivative of a carboxylic acid are accordingly used as the mold release agent contained in the thermoplastic composition according to the invention as component b). It is in this case particularly preferable for at least 50% by weight, particularly preferably at least 60% by weight and most preferably at least 75% by weight of the mold release agent, based in each case on the total weight of the mold release agent, to be based on the ester described hereinbefore.

The carboxylic acid used as the ester component of mold release agent b) is in particular in the form of saturated or unsaturated carboxylic acids having a number of carbon atoms in a range of from 6 to 26, particularly preferably in a range of from 8 to 24, even more preferably in a range of from 10 to 22, additionally preferably in a range of from 12 to 20 and most preferably in a range of from 14 to 18. According to the invention, particularly preferred carboxylic acids are therefore fatty acids.

Examples of suitable carboxylic acids include in particular caproic acid, oenanthic acid, caprylic acid, pelargonic acid, capric acid, lauric acid, myristic acid, fish oil, palmitic acid, pelagonic acid, margaric acid, stearic acid, isostearic acid, arachic acid, behenic acid, lignoceric acid, cerotic acid, undecylenic acid, oleic acid, elaidic acid, vaccenic acid, eicosenic acid, rape oil, cetoleic acid, erucic acid, nervonic acid, linoleic acid, linolenic acid, arachidonic acid, timnodonic acid, clupanodonic acid or cervonic acid.

Furthermore, hydroxycarboxylic acids are also comprised as suitable carboxylic acids; of these, hydroxy fatty acids, such as for example ricinoleic acid, 12-hydroxystearic acid, hydrogenated castor oil fatty acids (fatty acids containing small amounts of stearic acid and palmitic acid, as well as 12-hydroxystearic acid), sabinic acid, 2-hydroxytetradecanoic acid, ipurolic acid (3,11-dihydroxytetradecanoic acid), 2-hydroxyhexadecanoic acid, jalapinolic acid, juniperic acid, ambrettolic acid, aleuritic acid, 2-hydroxyoctadecanoic acid, 18-hydroxyoctadecanoic acid, 9,10-dihydroxyoctadecanoic acid, kamlolenic acid, ferronic acid, cerebronic acid, 9-hydroxystearic acid and 10-hydroxystearic acid are particularly preferred and 12-hydroxystearic acid and ricinoleic acid are most preferred.

The carboxylic acids mentioned hereinbefore can be used individually or as carboxylic acid mixtures to produce the esters, the use of natural fatty acid mixtures, in particular, being particularly preferred.

In principle, the alcohol component may be in the form of all the compounds based on two or more glycerol units known to the person skilled in the art. One or more compounds of structures I or II or mixtures thereof are particularly suitable as the alcohol component. In relation to these structures, reference is made to the foregoing discussion.

The alcohol component of the ester accordingly comprises diglycerols, triglycerols, tetraglycerols or else polyglycerols or a mixture thereof. These can be obtained by condensation of more than four glycerol molecules. Di-, tri-, tetra- or polyglycerols of this type can be obtained by methods known to the person skilled in the art, but in particular by base or acid-catalysed condensation of glycerol.

The esters of a carboxylic acid and an alcohol component of structure I or II that are used as the mold release agent or as a constituent of the mold release agent can be produced by any method known to the person skilled in the art for producing an ester of this type, but in particular by reacting the carboxylic acid with the alcohol component of structure I or II or else by reacting the carboxylic acid with glycidol.

In so far as the esters are produced by reacting the carboxylic acid with the alcohol component of structure I or II, then both components are submitted and subsequently catalysed in the presence of a suitable esterification catalyst. The esterification catalysts used can be acids, such as for example sulphuric acid or p-toluene sulphonic acid, or metals and the compounds thereof. Suitable examples are tin, titanium, zirconium which are used as finely divided metals or expediently in the form of the salts, oxides or soluble organic compounds thereof. In contrast to protonic acids, the metal catalysts are high-temperature catalysts which generally achieve their full activity only at temperatures above 180° C. They are however preferred in accordance with the invention because they produce fewer by-products, such as for example olefins, compared to proton catalysis. Esterification catalysts which are particularly preferred in accordance with the invention are one or more divalent tin compounds, or tin compounds or elemental tin which can react with the starting materials to form divalent tin compounds. For example, the catalyst used may be tin, tin (II) chloride, tin (II) sulphate, tin (II) alcoholates or tin (II) salts of organic acids, in particular of mono- and dicarboxylic acids. Particularly preferred tin catalysts are tin (II) oxalate and tin (II) benzoate.

The esterification reaction between the carboxylic acid and the alcohol component of structure I or II can be carried out using methods known to the person skilled in the art. It can be particularly advantageous in this regard to remove water formed during the reaction from the reaction mixture, this removal of the water being carried out preferably by distillation, optionally by distillation with excess alcohol. After the esterification reaction has been carried out, it is also possible to remove non-reacted alcohol from the reaction mixture, this removal of the alcohol also being carried out preferably by means of distillation. Furthermore, the catalyst remaining in the reaction mixture after completion of the esterification reaction, in particular after the separating-off of non-reacted alcohol, can be separated off, optionally after treatment with a base, by filtration or by centrifuging.

Furthermore, it is preferable to carry out the esterification reaction between the carboxylic acid and the alcohol component of structure I or II at a temperature in a range of from 50 to 300° C., particularly preferably in a range of from 100 to 280° C., most preferably in a range of from 150 to 270° C. and furthermore preferably in a range of from 200 to 250° C. The optimum temperatures depend on the feedstock alcohol(s), the progress of the reaction, the type of catalyst and the concentration of catalyst. They can easily be determined for each individual case by trials. Elevated temperatures increase the reaction speeds and promote secondary reactions, such as for example the elimination of water from alcohols or the formation of colored by-products. The desired temperature or the desired temperature range can be set by way of the pressure in the reaction vessel (slight excess pressure, normal pressure or optionally reduced pressure).

In so far as the ester is produced by reacting a carboxylic acid with glycidol, it is also preferable to carry out this esterification in the presence of suitable catalysts, phosphoric acid-based acidic catalysts being, in particular, preferred in this case. Catalysts of this type comprise in particular phosphoric acids or esters thereof. Examples of suitable catalysts include in particular phosphoric acid, phosphoric acid anhydride, polyphosphoric acid, orthophosphoric acid, metaphosphoric acid, pyrophosphoric acid, triphosphoric acid and tetraphosphoric acid and also acidic phosphoric acid esters, such as for example methyl acid phosphate, ethyl acid phosphate, isopropyl acid phosphate, butyl acid phosphate and 2-ethyl hexyl acid phosphate. Monoester compounds, diester compounds and mixtures can also be used.

Further details concerning the production of ester by reacting fatty acids with glycidol can be inferred inter alia also from EP-A-0 758 641.

Furthermore, mixtures of various esters which can each be obtained by esterification of a carboxylic acid with an alcohol or a glycidol, or else mixtures of at least one ester which can be obtained by esterification of a carboxylic acid with an alcohol and at least one further ester which can be obtained by esterification of a carboxylic acid with glycidol, can also be used as a mold release agent or a constituent of a mold release agent. Mixtures of various esters which differ in terms of their carboxylic acid component can also be used as the mold release agent or as a constituent of the mold release agent.

According to a particularly preferred embodiment of the thermoplastic composition according to the invention, the mold release agent contained as component b) contains an ester of a carboxylic acid, preferably of a fatty acid, and diglycerol, triglycerol or tetraglycerol.

Furthermore, it is preferable in relation to the ester, which is used as the mold release agent or a constituent of the mold release agent (component b), of a carboxylic acid and the alcohol component of structure I or II for not all the hydroxyl groups of the alcohol to be esterified, but for some of the hydroxyl groups to remain unesterified. In this connection, it is particularly preferable for at least 5 mol %, particularly preferably at least 10 mol %, even more preferably at least 20 mol %, additionally preferably at least 30 mol %, additionally preferably at least 40 mol % and most preferably at least 50 mol % of the hydroxyl groups of the alcohol not to be esterified with the carboxylic acid group of the carboxylic acid. The wording "at least 5 mol % not esterified with the carboxylic acid group of the carboxylic acid" is in this case intended to express the fact that, in the mold release agent contained in the composition according to the invention, at least 5 mol % of all the hydroxyl groups which were originally present in the alcohol component of structure I or II for producing the mold release agent from a carboxylic acid and the alcohol component of structure I or II are not esterified and are therefore still in hydroxyl group form even in the finished mold release agent.

Furthermore, the thermoplastic composition according to the invention can contain, in addition to the thermoplastic polymer (component a) and the mold release agent (component b), optionally also further additives. The further additives include in particular impact toughness modifiers, filler materials, reinforcing agents, flame retardant compounds, heat and UV stabilizers, antioxidants, other processing auxiliaries, nucleating agents, dyes and antidrip agents. Examples of suitable impact toughness modifiers, filler materials, reinforcing agents and flame retardant compounds may be inferred inter alia from US 2005/0234171 A1.

Furthermore, it is preferable in relation to the thermoplastic composition according to the invention for the thermoplastic composition to contain a1) 60 to 99.99% by weight, particularly preferably 80 to 99.8% by weight and most preferably 90 to 99.6% by weight of the thermoplastic polymer, b1) 0.01 to 20% by weight, particularly preferably 0.1 to 10% by weight and most preferably 0.2 to 5% by weight of the mold release agent and c1) 0 to 20% by weight, particularly preferably 0.1 to 10% by weight and most preferably 0.2 to 5% by weight of the further additives, based in each case on the total weight of the thermoplastic composition, the sum of components a1) to c1) being 100% by weight.

In another configuration according to the invention, it is preferable for the thermoplastic composition to contain a2) 1 to 69.99% by weight, particularly preferably 1.5 to 49.8% by weight and most preferably 2 to 19.6% by weight of the thermoplastic polymer, b2) 0.01 to 20% by weight, particularly preferably 0.1 to 10% by weight and most preferably 0.2 to 5% by weight of the mold release agent, c2) at least 10% by weight, preferably at least 20% by weight and particularly preferably at least 30% by weight of a biodegradable filling component and d2) 0 to 20% by weight, particularly preferably 0.1 to 10% by weight and most preferably 0.2 to 5% by weight of the further additives, based in each case on the total weight of the thermoplastic composition, the sum of components a2) to d2) being 100% by weight. The biodegradable filling component may in principle be in the form of all components which are known and appear suitable to the person skilled in the art. These include in particular single and multiple sugars such as starch and starch derivatives, cellulose and cellulose derivatives, hemp, jute, bast, cane, reed, in particular reed flour, and other substances obtained from plants or a combination of at least two thereof. Within this configuration, it is also preferable for at least 10% by weight, preferably at least 50% by weight and particularly preferably at least 75% by weight of the thermoplastic polymer, based in each case on the thermoplastic polymer, to be based on a monomer which can be generated from renewable raw materials, such as lactic acid. This thermoplastic composition is particularly suitable for biodegradable single-use and disposable articles such as crockery or cutlery.

According to a particular embodiment of the thermoplastic composition according to the invention, it is preferable for said composition to contain less than 0.001% by weight, particularly preferably less than 0.0005% by weight and most preferably less than 0.0001% by weight of a saturated, $\alpha$-olefin oligomer of at least one $C_6$-$C_{18}$ $\alpha$-olefin.

A contribution to achieving at least a part of the object mentioned at the outset is also made by a method for producing a thermoplastic composition containing
  a) a thermoplastic polymer,
  b) a mold release agent, and
  c) optionally further additives,
containing the method steps:
  i) providing a thermoplastic polymer or a precursor of the thermoplastic polymer;
  ii) providing the mold release agent, containing an ester based at least on
    an alcohol component based on two or more glycerol units; and
    at least one carboxylic acid or a derivative of a carboxylic acid or both;
  iii) optionally providing further additives;
  iv) mixing components i), ii) and optionally iii).

As the thermoplastic polymer, mold release agent and further additives, preference is given to those thermoplastic polymers, mold release agents and further additives which were mentioned at the outset in relation to the thermoplastic composition according to the invention as being preferred thermoplastic polymers, mold release agents and further additives.

These components are firstly provided in method steps i), ii) and optionally iii). Components i), ii) and optionally iii) are then mixed in method step iv) of the method according to the invention.

Components i), ii) and optionally iii) can in this case be mixed using known technologies. Thus, the mixing can for example be a dry mixing process in which the various components are mixed below the melt processing temperature of the thermoplastic polymer, or else a melt mixing method in which the components are optionally premixed, and mixed at the melt processing temperatures of the thermoplastic polymer. The melt mixing methods include in particular the melt kneading method which is preferred in accordance with the invention and can be implemented, for example, by continuous melt kneading using a single-screw kneading machine, a twin-screw kneading machine of the toothing-same-direction-of-rotation type, toothing-different-directions-of-rotation type, non-toothing-same-direction-of-rotation type, non-toothing-different-directions-of-rotation type or of other types, or by batch melt kneading using a roller kneading machine, a Banbury kneading machine or the like. A combination of a dry mixing method and a melt mixing method is also conceivable.

Furthermore, the order and the nature of the addition of the individual components i), ii) and optionally iii) into the mixing device are in principle non-critical. Thus, for example, the thermoplastic polymer and optionally the additives can first be placed in the mixing device and the mold release agent be added only subsequently. It is also conceivable firstly to mix the mold release agent or a part of the mold release agent with or more other components of the thermoplastic composition according to the invention, for example with one or more additives, and then either to add this mixture to the thermoplastic polymer which is already contained in the mixing device or else firstly to place this mixture in the mixing device and only then to add the thermoplastic polymer.

In further configurations of the method according to the invention for producing a thermoplastic composition, the mixing is carried out in accordance with at least one of the following measures:

M1) at the glass transition temperature of the thermoplastic polymer or at a temperature above the glass transition temperature of the thermoplastic polymer;

M2) the mold release agent being more liquid than the thermoplastic polymer; or

M3) at least a part of the mold release agent being added to the precursor of the thermoplastic polymer.

Furthermore, it is in keeping with configurations according to the invention if two or more of the foregoing measures are combined. Specifically, as configurations, this produces the following combinations of measures illustrated based on the combinations of figures: M1M2, M1M3, M2M3 and M1M2M3.

In accordance with a preferred embodiment M1 of the method according to the invention, components i), ii) and optionally iii) are mixed in method step iv) of the method according to the invention by a melt mixing method. In this connection, it is particularly preferable for the mixing in method step iv) to be carried out at the glass transition temperature of the thermoplastic polymer or at a temperature above the glass transition temperature of the thermoplastic polymer. It is particularly preferable in this connection for the mixing to be carried out at a temperature in a range of from 5 degrees below the glass transition temperature ($T_g$) to 200° C. above the glass transition temperature of the thermoplastic polymer used, particularly preferably at a temperature in a range of from 1 degree below the glass transition temperature ($T_g$) to 180° C. above the glass transition temperature of the thermoplastic polymer used and most preferably at a temperature in a range of from 1 degree above the glass transition temperature ($T_g$) to 150° C. above the glass transition temperature of the thermoplastic polymer used, although the upper limit of the temperature range is delimited substantially by the decomposition temperature of the thermoplastic polymer used. Furthermore, it is in keeping with configurations according to the invention if the mixing is carried out at temperatures in a range of from 10 to 180° C. and preferably 50 to 150° C. above the glass transition temperature of the thermoplastic polymer used.

In configuration M2 according to the invention, in which the mold release agent is more liquid than the thermoplastic polymer, it is preferable to use the mold release agent at a temperature at which said mold release agent is liquid and the thermoplastic polymer is not yet liquid. Preferably, the temperature of the thermoplastic polymer is in this case below the glass transition temperature of this polymer. Thus, it is preferable if the melting temperature of the mold release agent and the glass transition temperature of the thermoplastic polymer differ by at least 5° C., preferably at least 10° C. and particularly preferably at least 30° C. Furthermore, it is preferable in this configuration and also generally to use the thermoplastic polymer as granules. Generally speaking, all granule forms known to the person skilled in the art, with a spherical or cylindrical three-dimensional shape, are possible in this case too. The granule size, which is determined by means of sieve analysis, is for at least 70% by weight of the granular particles in a range of from 0.01 to 5 cm and preferably in a range of from 0.1 to 4 cm. The procedure according to this configuration allows the surfaces of the granular particles to be coated at least partly with the mold release agent according to the invention, so that at least partially coated thermoplastic polymer granules are obtained. This allows the mold release agent according to the invention to be distributed as homogeneously as possible in the thermoplastic composition, in particular when said composition is prepared as a formulation for the subsequent extrusion.

In configuration M3 according to the invention, in which the mold release agent is added to the precursor of the thermoplastic polymer, the mold release agent may be either in liquid or in solid form. The precursor of the thermoplastic polymer may in principle be in the form of all precursors known to the person skilled in the art before the thermoplastic polymer is obtained. These include in particular precursors having a lower molecular weight than the final thermoplastic polymer. In this case, it is preferable for the molecular weight of the precursor to differ from that of the finished thermoplastic polymer by a factor of at least 1.1, preferably at least 1.5 and particularly preferably at least by a factor of 2. In addition to the monomers and oligomers, which preferably consist of 2 to 100 monomers, used to produce the thermoplastic polymer, a further component, in particular of polycondensates, is a prepolymer which is completely polymerized, usually by heat treatment, to form the finished thermoplastic polymer. Preferably, the prepolymer is based on more than 100 monomers as repeating units, wherein the number of monomers as repeating units, and thus the final molecular weight of the finished thermoplastic polymer, is not achieved. Thus, it is particularly preferable to add the mold release agent according to the invention in each case to the monomers, oligomers or the prepolymer or at least two of these. This allows, in addition to a homogeneous distribution of the mold release agent according to the invention, also an incorporation, usually as a result of the conditions prevailing during the polymerization or complete polymerization, of the mold release agent as a result of chemical bonds with the thermoplastic polymer.

In so far as the heated composition obtained in method step iv) in the case of a melt mixing method is not supplied directly to the production of molded articles, the method can also include the further method step v):

v) cooling the thermoplastic composition, preferably to a temperature in a range of from 10 to 30° C. and particularly preferably to 15 to 25° C.

Furthermore, the thermoplastic composition which was obtained in method step iv) can be supplied, before, during or else after the carrying-out of method step v), but optionally also after method step iv) and without carrying out method step v), to a further granulation.

Furthermore, it is preferable in relation to the method according to the invention for components a) to c) to be mixed with one another in relative amounts such that the thermoplastic composition obtained by mixing components a) to c) contains a1) 60 to 99.99% by weight, particularly preferably 80 to 99.8% by weight and most preferably 90 to 99.6% by weight of the thermoplastic polymer,
b1) 0.01 to 20% by weight, particularly preferably 0.1 to 10% by weight and most preferably 0.2 to 5% by weight of the mold release agent, and
c1) 0 to 20% by weight, particularly preferably 0.1 to 10% by weight and most preferably 0.2 to 5% by weight of the further additives,
based in each case on the total weight of the thermoplastic composition, the sum of components a1) to c1) being 100% by weight.

In another configuration of the method according to the invention, it is preferable for components a2) to d2) to be mixed with one another in relative amounts such that the thermoplastic composition obtained by mixing components a2) to d2) contains a2) 1 to 69.99% by weight, particularly preferably 1.5 to 49.8% by weight and most preferably 2 to 19.6% by weight of the thermoplastic polymer,
b2) 0.01 to 20% by weight, particularly preferably 0.1 to 10% by weight and most preferably 0.2 to 5% by weight of the mold release agent,
c2) at least 10% by weight, preferably at least 20% by weight and particularly preferably at least 30% by weight of a biodegradable filling component and
d2) 0 to 20% by weight, particularly preferably 0.1 to 10% by weight and most preferably 0.2 to 5% by weight of the further additives,
based in each case on the total weight of the thermoplastic composition, the sum of components a2) to d2) being 100% by weight.

In addition, according to the invention, it is preferable, over the course of the method according to the invention for producing a thermoplastic composition, for a saturated, $\alpha$-olefin oligomer of at least one $C_6$-$C_{18}$ $\alpha$-olefin to be used in at most an amount such that the thermoplastic composition obtained by mixing components a1) to c1) or a2) to d2) contains less than 0.001% by weight, particularly preferably less than 0.0005% by weight and most preferably less than 0.0001% by weight of the saturated, $\alpha$-olefin oligomer.

A contribution to achieving the objects mentioned at the outset is also made by the thermoplastic composition obtainable by the method described hereinbefore. In this case and in general, it is preferable for the thermoplastic composition to display a yellowing index of less than 6.64, preferably less than 6, particularly preferably less than 5 and also further preferably less than 4.9 and additionally preferably less than 4.7. The yellowing index is determined by the yellow value which is measured as the b* value in accordance with the L*,a*,b* color system of a sample of the composition to be examined in accordance with DIN 5033. In many cases, the yellowing index is not less than 2 or 3.

A contribution to achieving at least a part of the object mentioned at the outset is also made by a method for producing a molded article based on a thermoplastic composition, including the method steps:

I) providing a thermoplastic composition according to the invention;
II) heating the thermoplastic composition to the glass transition temperature of the thermoplastic polymer or to a temperature above the glass transition temperature of the thermoplastic polymer;
III) producing a molded article from the heated, thermoplastic composition produced in method step II).

In step I) of the method according to the invention for producing a molded article, a thermoplastic composition according to the invention is firstly provided, this provision being carried out preferably by a method including method steps i), ii), iv) and optionally iii) and/or v).

Then, in method step II), the thermoplastic composition is heated to the glass transition temperature of the thermoplastic polymer or to a temperature above the glass transition temperature of the thermoplastic polymer. In this connection, it is again preferable for the thermoplastic composition to be heated to a temperature in a range of from 5 degrees below the glass transition temperature ($T_g$) to 100° C. above the glass transition temperature of the thermoplastic polymer used, particularly preferably to a temperature in a range of from 1 degree below the glass transition temperature ($T_g$) to 50° C. above the glass transition temperature of the thermoplastic polymer used and most preferably to a temperature in a range of from 1 degree above the glass transition temperature ($T_g$) to 20° C. above the glass transition temperature of the thermoplastic polymer used, although here too the upper limit of the temperature range is delimited substantially by the decomposition temperature of the thermoplastic polymer used.

In principle, method steps I) and II) can be carried out simultaneously or successively. Simultaneous carrying-out of method steps I) and II) is for example beneficial when the thermoplastic composition is produced by means of a melt mixing method. In this case, it may optionally be advantageous to transfer the composition produced by the melt mixing method directly to a molded article. Successive carrying-out of method steps I) and II) is for example beneficial when the thermoplastic composition is produced by means of a dry mixing method or else when the thermoplastic composition is produced by means of a melt mixing method, but is not subjected to the formation of a molded article immediately after production; on the contrary, it is firstly cooled in accordance with method step v).

In method step III) of the method according to the invention for producing a molded article, a molded article is produced from the heated, thermoplastic composition produced in method step II). Particular examples of the method for producing a molded article are injection molding, extrusion molding, compression molding, layered molding, lamination molding, hollow molding, vacuum molding and transfer molding, injection molding being particularly preferred.

Furthermore, it is in keeping with a configuration of the method according to the invention for producing a thermoplastic molded article for, in at least one further method step IV), at least a partial region of the molded article obtained in method step III) to serve as a molded article blank and to be reduced in relation thereto in its mass cross section. The mass cross section is the cross section of a region of the molded article that is made all the way through of the thermoplastic molding compound according to the invention. For example in receptacles or containers, the mass cross section is the thickness of a wall of these receptacles or containers. In molded articles which are embodied in a more thread or cord-shaped manner, the mass cross section is the thickness of these threads or cords. In more planar formations such as plates, layers, webs, films or foils, the mass cross section is the thickness of these planar formations. For reducing the mass cross section, use may in principle be made of all suitable methods known to the person skilled in the art for this purpose. Examples of these include stretching in one or two directions, drawing in one or two directions, centrifuging or blow molding, which are each carried out preferably at elevated temperatures at which the thermoplastic composition according to the invention is sufficiently soft or even liquid to allow stretching, drawing, centrifuging or blow molding to be carried out. The partial region in which the cross section is reduced constitutes preferably at least 50% and particularly preferably at least 80% of the molded article obtained in step III). Generally speaking, stretching or drawing is carried out when a fiber is to be obtained from the molded article obtained in step III). In the production of foils, on the one hand, the drawing or stretching can be carried out in one or more dimensions. Thus, the web issuing from an extruder can be drawn onto a roll at a higher speed than the exit speed from the extruder. If, on the other hand, a receptacle or container is to be obtained, then, apart from the stretching, drawing and centrifuging, above all blow molding is used in step IV). In this case, the mass cross section is reduced by applying a gas pressure. The gas pressure is generally selected in such a way as to allow the thermoplastic composition, which is usually heated at least to glass transition temperature, of the molded article obtained in step III) to be elongated. Generally speaking, the elongation is delimited as a result of the use of a mold having the end shape of the molded article. In this way, it is possible to produce, in addition to receptacles such as freezer compartments, trays and packagings for food products such as fruit, vegetables or meat, as well as pharmaceutical compositions as tablets, capsules, suppositories or powders, also containers for liquids. These liquid containers can be used not only for liquids of the cosmetic or pharmaceutical industry, but also in the food industry, preferably in the drinks industry, as bottles, particularly preferably as multiple-use containers such as PET or PLA bottles. It is also possible for two or more of method steps I) to IV) to be supplemented by further method steps and/or to proceed at least with a time overlap. This applies in particular to method steps III) and IV).

In particular in the production of PET or PLA or PET-PLA bottles, a thermoplastic composition according to the invention containing at least 80% by weight of PET or a mixture of a multiple sugar such as starch, usually at a proportion based on the mixture in a range of from 30 to 70% by weight, preferably in a range of from 40 to 60% by weight, with PLA or PLA with PET is provided in step I). Said composition is processed via step II) to form in step III) a molded article blank comprising, in addition to a closure region, usually a stabilizing collar which follows the closure region and is followed by a sleeve-like bottle region. In step IV), gas, which expands the bottle region up to a delimitation by the shape of the bottle, is fed through the closure region. In this case, the mass cross section of the wall of the bottle region decreases at the same time as the volume of the bottle region increases. For this type of production, use may be made of stretch blow molding machines, for example, which are supplied inter alia by Böhm Fertigungstechnik Suhl GmbH, Germany.

Furthermore, the invention also allows other molded articles apart from bottles to be produced. These include single and multiple-use containers such as plates, trays, pots or cups, and cutlery such as knives, forks or spoons. The biodegradable thermoplastic compositions according to the invention are particularly suitable for these applications.

A further contribution to achieving at least some of the objects mentioned at the outset is also made by molded articles, preferably a bottle, particularly preferably a PET bottle, obtainable by the method according to the invention described hereinbefore for producing a molded article. Preferably, this molded article displays a yellowing index of less than 6.64, preferably less than 6, particularly preferably less than 5 and also further preferably less than 4.9 and additionally preferably less than 4.7. In many cases, the yellowing index is not below 2 or 3.

A contribution to achieving at least some of the objects mentioned at the outset is also made by the use of a mold release agent made up of at least one alcohol component based on two or more glycerol units; and at least one carboxylic acid or a derivative of a carboxylic acid or both, in thermoplastic compositions, in particular as a mold release agent in thermoplastic compositions based on thermoplastic polyesters. In relation to preferred embodiments of the mold release agent and the constituents thereof, reference is made to the foregoing discussion.

As mold release agents and as thermoplastic polymers, preference is here too given to those mold release agents and thermoplastic polymers which were mentioned at the outset in relation to the thermoplastic composition according to the invention as being preferred mold release agents and thermoplastic polymers. The use of a mold release agent containing an ester of at least one alcohol component based on two or more glycerol units, and at least one carboxylic acid or a derivative of a carboxylic acid or both, in the production of liquid containers, in particular PET bottles, made of thermoplastic polymers is also a preferred configuration of the present invention. In relation to preferred embodiments of the mold release agent and the constituents thereof, reference is made to the foregoing discussion.

The invention will now be described in greater detail with reference to non-limiting examples.

EXAMPLES

Producing Diglycerol Stearate 343 g of diglycerol (Solvay GmbH, Germany), 725 g of industrial stearic acid (Edenor ST1 from Cognis Oleochemicals GmbH, Germany) and tin (II) oxalate (Fluka) are combined and heated under nitrogen. The reaction starts at approximately 200° C. Within 3 hours the reaction water is further drawn off by applying vacuum and the vacuum is reduced to 15 mbar. Subsequently, the reaction is continued for a further 5 hours. At an acid number of <1, the reaction is ended. The mixture is cooled to 90° C., mixed with bleaching clay and filtered. Once the product had solidified, it was grated. The melting point was 55° C.

Producing a Thermoplastic Composition 6 kg of polyethylene terephthalate (PET SP04 from Catalana de Polimers) are placed in a 15 kg Henschel mixer. The mixing wall temperature was 40° C. Furthermore, 0.5% by weight of the previously produced diglycerol stearate was added as a mold release agent.

Subsequently, the material was granulated on a granulator (ZSK 26Mcc) with a stuffing screw.

Producing Molded Articles from the Thermoplastic Composition

A fully hydraulic injection molding machine with a Battenfeld HM800/210-type hydraulic clamping unit was used for producing molded articles from the thermoplastic composition. The maximum clamping force is 800 kN, the screw diameter is 25 mm. A mold having a conically tapering, rectangular core was used as the experimental mold. A force transducer having a maximum measuring range of 2 kN was attached to the ejector rod for determining the demolding force. The molding compound was predried at approximately 225° C. for about 4 hours.

The demolding forces (specified in N) were measured in 10 cycles:

| PET SP04 | PET SP04 + diglycerol stearate |
|---|---|
| 861 | 436 |
| 881 | 434 |
| 880 | 432 |
| 877 | 436 |
| 870 | 434 |
| 880 | 403 |
| 879 | 430 |
| 872 | 408 |
| 877 | 433 |
| 873 | 394 |
| Mean: 875 | Mean: 424 |

The above table shows that the addition of an ester of diglycerol and stearic acid as a mold release agent to the thermoplastic composition leads to a significant improvement in demoldability and to a noticeably improved detaching behavior from the walls of an injection mold. Molded articles having high transparency and a smooth and uniform surface structure were obtained. Furthermore, a yellowing index (yellow value) in accordance with DIN 5033 of on average 6.64 for PET SP04 and 4.6 for PET SP04+diglycerol stearate could be determined.

The invention claimed is:

1. A thermoplastic composition comprising
  a. a thermoplastic polyester selected from the list consisting of polyethylene terephthalates, polyalkylene naphthalates, polyalkylene dibenzoates or mixtures of at least two of these thermoplastic polyesters,
  b. a mold release agent, and
  c. optionally further additives,
  wherein the mold release agent comprises an ester of
  at least one alcohol component based on two or more glycerol units, the alcohol component being selected from a diglycerol, a triglycerol or a tetraglycerol; and
  at least one carboxylic acid or a derivative of a carboxylic acid or both, the carboxylic acid or the derivative of a carboxylic acid comprising a number of carbon atoms in a range of from 6 to 26;
  wherein a metal catalyst which is a high-temperature catalyst is used during esterification wherein the high-temperature catalyst achieves full activity at a temperature of greater than 180° C.; and
  wherein the thermoplastic composition comprises less than 0.001% by weight of a saturated, α-olefin oligomer of at least one $C_6$-$C_{18}$ α-olefin.

2. The thermoplastic composition according to claim 1, wherein the alcohol component corresponds to structure I or structure II or a mixture of the two, wherein

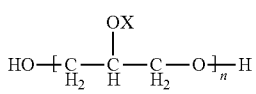

structure I

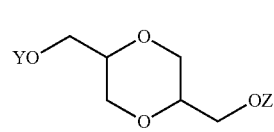

structure II

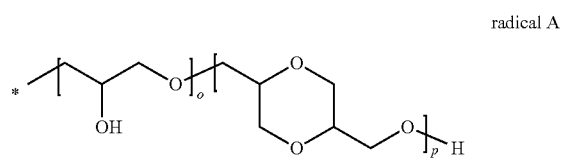

radical A with
  n is an integer from the range of from 2 to 100;
  o is an integer from the range of from 0 to 70;
  p is an integer from the range of from 0 to 70;
  * is the linking of radical A;
  X is hydrogen or radical A;
  Y is hydrogen or radical A; and
  Z is hydrogen or radical A.

3. The thermoplastic composition according to claim 1, wherein the thermoplastic comprises polyethylene terephthalate and the mold release agent comprises diglycerol stearate.

4. The thermoplastic composition according to claim 1 wherein at least about 10 mol % of the hydroxyl groups of the alcohol component are not esterified with the carboxylic acid group of the carboxylic acid.

5. The thermoplastic composition according to claim 1 wherein the thermoplastic composition comprises
  a1) from about 60 to about 99.99% by weight of the thermoplastic polyester,
  b1) from about 0.01 to about 20% by weight of the mold release agent and
  c1) from 0 to about 20% by weight of the further additives,
  based in each case on the total weight of the thermoplastic composition, the sum of components a1) to c1) being 100% by weight.

6. The thermoplastic composition according to claim 1 wherein the thermoplastic composition comprises
  a2) from about 1 to about 69.99% by weight of the thermoplastic polyester,
  b2) from about 0.01 to about 20% by weight of the mold release agent,
  c2) at least about 10% by weight of a biodegradable filling component and
  d2) from 0 to about 20% by weight of the further additives,
  based in each case on the total weight of the thermoplastic composition, the sum of components a2) to d2) being 100% by weight.

7. A method for producing a thermoplastic composition comprising
  a) a thermoplastic polyester as thermoplastic polymer selected from polyethylene terephthalates, polyalkylene naphthalates, polyalkylene dibenzoates or mixtures of at least two of these thermoplastic polyesters,
  b) a mold release agent, and
  c) optionally further additives,
  comprising the method steps:
  i) providing a thermoplastic polymer or a precursor of a thermoplastic polymer or both;
  ii) providing the mold release agent containing an ester, based on an alcohol component based on two or more glycerol units, the alcohol component being selected from a diglycerol, a triglycerol or a tetraglycerol or at least two thereof; and at least one carboxylic acid or a derivative of a carboxylic acid or both, the carboxylic acid or the derivative of a carboxylic acid comprising a number of carbon atoms in a range of from 6 to 26;

iii) optionally providing further additives;
iv) mixing components i), ii) and optionally iii); and wherein a metal catalyst which is a high-temperature catalyst is used during esterification wherein the high-temperature catalyst achieves full activity at temperatures above 180° C.; and wherein a saturated, α-olefin oligomer of at least one $C_6$-$C_{18}$ α-olefin is used in at most an amount such that the thermoplastic composition obtained by mixing components a) to c) comprises less than 0.001% by weight of the saturated, α-olefin oligomer of at least one $C_6$-$C_{18}$ α-olefin.

8. The method according to claim 7, wherein the mixing is carried out in accordance with at least one of the following measures:

M1) at the glass transition temperature of the thermoplastic polymer or at a temperature above the glass transition temperature of the thermoplastic polymer;

M2) the mold release agent being more liquid than the thermoplastic polymer; or

M3) at least a part of the mold release agent being added to the precursor of the thermoplastic polymer.

9. The method according to claim 7 wherein the thermoplastic comprises polyethylene terephthalate and the mold release agent comprises diglycerol stearate.

10. The method according to claim 7, wherein at least about 10 mol % of the hydroxyl groups of the alcohol component are not esterified with the carboxylic acid group of the carboxylic acid.

11. The method according to claim 7 wherein components a) to c) are mixed with one another in relative amounts such that the thermoplastic composition obtained by mixing components a) to c) comprises a) from about 60 to about 99.99% by weight of the thermoplastic polymer,
b) from about 0.01 to about 20% by weight of the mold release agent and
c) from 0 to about 20% by weight of the further additives, based in each case on the total weight of the thermoplastic composition, the sum of components a) to c) being 100% by weight.

12. A thermoplastic composition, obtainable by the method according to claim 7.

13. The thermoplastic composition according to claim 12 having a yellowing index of less than 6.64 as measured in accordance with DIN 5033.

14. A method for producing a molded article based on a thermoplastic composition, comprising the method steps:

I) providing a thermoplastic composition according to claim 1;
II) heating the thermoplastic composition to the glass transition temperature of the thermoplastic polymer or to a temperature above the glass transition temperature of the thermoplastic polymer;
III) producing a molded article from the heated, thermoplastic composition produced in method step II).

15. The method according to claim 14, wherein, in a further method step IV), at least a partial region of the molded article obtained in method step III) is reduced in its mass cross section in relation to method step III).

16. The method according to claim 15, wherein the cross section is reduced by applying a gas pressure.

17. The method according to claim 14, wherein the molded article is a container adapted to hold liquid.

18. A molded article obtainable by a method according to claim 14.

19. The molded article according to claim 18, having a yellowing index of less than 6.64 as measured in accordance with DIN 5033.

20. The thermoplastic composition according to claim 1, wherein said metal catalyst comprises one or more divalent tin compounds.

21. The thermoplastic composition according to claim 7, wherein said metal catalyst comprises one or more divalent tin compounds.

22. The thermoplastic composition according to claim 1, wherein said mold release agent comprises diglycerol stearate wherein the thermoplastic composition has a yellow value of about 4.6 as determined by the DIN 5033 test.

23. The thermoplastic composition according to claim 7, wherein said mold release agent comprises diglycerol stearate wherein the thermoplastic composition has a yellow value of about 4.6 as determined by the DIN 5033 test.

* * * * *